UNITED STATES PATENT OFFICE.

GEORGE O. SEWARD, OF EAST ORANGE, NEW JERSEY, AND FRANZ VON KUGELGEN, OF HOLCOMBS ROCK, VIRGINIA, ASSIGNORS TO VIRGINIA LABORATORY COMPANY, OF NEW YORK, N. Y., A CORPORATION OF NEW YORK.

PROCESS OF PRODUCING STEEL.

No. 874,628.　　　Specification of Letters Patent.　　　Patented Dec. 24, 1907.

Application filed July 6, 1907. Serial No. 382,484.

*To all whom it may concern:*

Be it known that we, GEORGE O. SEWARD, a citizen of the United States, residing in East Orange, in the county of Essex and State of New Jersey, and FRANZ VON KUGELGEN, a subject of the German Emperor, residing in Holcombs Rock, in the county of Bedford and State of Virginia, have jointly invented certain new and useful Improvements in Processes of Producing Steel, of which the following is a specification.

The present invention provides an improvement in processes of producing steel in the electric furnace, and consists in the replacing of the usual carbon electrode by a pencil of the iron which is to be refined, and melting the same in contact with a refining slag. The use of carbon pencils is thus avoided, and the refining effect takes place at the hottest part of the furnace, resulting in economy of heat and greater action from the refining slag used. The cost of carbon pencils is avoided, and the radiation and other losses incident to electric furnaces of the induction and canal-resistance types are minimized.

Pig iron or any iron which it is desired to refine is cast into blocks or electrodes of suitable shape which are connected in any suitable manner with the source of electric current and serve as electrodes to carry the current into the refining slag. It is preferable to use a double pole furnace rather than have the metal on the bottom of the crucible one pole, but the latter arrangement may be used if desired. The heat is produced either by the resistance of the slag to the passage of the current, or by an arc between the metallic electrode and the slag, or by a combination of both. The pencil melts off gradually and collects at the bottom of the furnace, the refining being partly effected as the electrode melts and partly as it lies at the bottom of the crucible under the refining slag. The refining effect is quick and complete, and no recarburization is possible. It is possible to use a much more oxidizing slag than would be possible with carbon pen ils, because a slag containing a great deal of iron oxid would attack a carbon pencil seriously, but would have only a good effect in refining a metal pencil as it melted. It is also possible, as we have no carbon in the furnace, to introduce air as in the Bessemer process, and thus assist in burning out the impurities from the metal to be refined. A combination of Bessemer and electric effect is thus secured.

A patent was granted to us December 12, 1905, (No. 807,034) for decarburizing a metalliferous substance by fusing it as an electrode in presence of a substance having a high affinity for carbon. The object in that case was to get rid of carbon. The present invention goes further and removes other impurities than carbon, and the slag has to be selected with such an end in view. A suitable slag, for example, would be a basic slag such as is used in the open hearth steel process, with a large excess of iron ore or oxid.

The combined use of electricity and an air blast would be particularly adapted to refining such irons as contain too little phosphorus for being blown in a converter, and too much to be available as a foundry iron.

We claim as our invention:—

1. The process of producing steel, which consists in fusing iron as an electrode in presence of a refining slag, substantially as described.

2. The process of producing steel, which consists in fusing iron as an electrode in presence of a refining slag, while blowing air into the furnace in order to oxidize a part of the impurities.

In witness whereof, I have hereunto signed my name in the presence of two subscribing witnesses.

GEORGE O. SEWARD.

Witnesses:
　　HARRY R. LEE,
　　J. H. WEBB.

In witness whereof, I have hereunto signed my name in the presence of two subscribing witnesses.

FRANZ VON KUGELGEN.

Witnesses:
　　HARRY R. LEE,
　　J. H. WEBB.